Oct. 25, 1960     O. F. FLAUGH ET AL     2,957,528
PROPELLER MECHANICAL LOW PITCH STOP
Filed Nov. 4, 1955     3 Sheets-Sheet 2

LOW PITCH    GOVERNING    FEATHER    NEGATIVE
STOP POSITION    RANGE

INVENTORS
OREN F. FLAUGH
BY RICHARD A. HIRSCH
JAMES R. MANSFIELD
*Craig V. Martin*
ATTORNEY Oct. 25, 1960    O. F. FLAUGH ET AL    2,957,528
PROPELLER MECHANICAL LOW PITCH STOP
Filed Nov. 4, 1955    3 Sheets-Sheet 3

INVENTORS
OREN F. FLAUGH
BY RICHARD A. HIRSCH
JAMES R. MANSFIELD
Craig V. Martin
ATTORNEY United States Patent Office 2,957,528
Patented Oct. 25, 1960

2,957,528

PROPELLER MECHANICAL LOW PITCH STOP

Oren F. Flaugh, Dayton, Richard A. Hirsch, West Milton, and James R. Mansfield, Troy, Ohio, assignors to General Motors Corporation, Detroit, Mich., a corporation of Delaware Filed Nov. 4, 1955, Ser. No. 545,034

13 Claims. (Cl. 170—160.33)

This invention pertains to variable pitch propellers, and particularly to a mechanical low pitch stop for variable pitch propellers.

Heretofore, it has been recognized that a variable pitch propeller must include stop means for limiting movement of the blades in a decrease pitch direction during constant speed propeller operation. The stop means prevent the blades from moving to a pitch position wherein negative thrust is developed when the aircraft is in flight. The present invention relates to a releasable mechanical low pitch stop which prevents movement of the blades below a predetermined low angle in the governing range while permitting propeller operation in the negative thrust range. Accordingly, among our objects is the provision of a mechanical low pitch stop for variable pitch propellers; the further provision of a spring engaged, fluid pressure releasable mechanical low pitch stop; and the still further provision of a mechanical low pitch stop including coacting cam surfaces which permit propeller feathering.

The aforementioned and other objects are accomplished in the present invention by incorporating a pair of juxtaposed, annular members in the propeller hub, each member having a plurality of circumferentially spaced jaws on an end surface. Specifically, the propeller may be generally of the type disclosed in the Blanchard, et al., Patents Nos. 2,307,101 and 2,307,102 wherein each propeller blade is actuated by an independent servo-motor which is operable to rotate its respective blade about its longitudinal axis. The servo-motors are controlled by a fluid pressure system including pressure developing means and a control valve, the fluid pressure system being disposed within a regulator attached to and rotatable with the propeller hub. Each propeller blade is operatively connected to a bevel type blade gear, and the several blade gears mesh with a master gear supported in the hub for rotation about the horizontal propeller axis. The master gear coordinates the pitch adjusting movement of all propeller blades through their respective blade gears.

The master gear is connected by straight splines to a sleeve coaxial with the horizontal propeller axis. The sleeve has a radially extending annular flange, the outer end surface of which has a plurality of circumferentially spaced jaws extending axially therefrom. A second sleeve, coaxial with the propeller axis, is slidably received within the first mentioned sleeve. The second sleeve has an annular flange portion constituting a piston, the piston having a surface exposed to a servo chamber. The second sleeve has bolted thereto an annulus having a plurality of circumferentially spaced jaws arranged to cooperate with the jaws on the first sleeve. The piston and the annulus are normally urged towards the first sleeve by a plurality of springs, and the annulus is restrained against rotation relative to the hub by reason of having a straight spline connection therewith.

The coacting jaws on the first sleeve and the annulus have inclined cam, or ramp, surfaces at one end which enable movement of the propeller blades to a feathering position. The other ends of the jaws terminate in abrupt shoulders which abut at a predetermined minimum safe low angle in the governing range. During propeller operation in the governing range, the servo chamber is connected to drain, and, hence, the mechanical low pitch stop is conditioned for operation. When negative thrust operation is selected, the servo chamber is subjected to fluid under pressure and the piston moves axially to separate the coacting jaws. With the mechanical low pitch stop in the disengaged position, the propeller blades can be moved to a pitch position below the normal low pitch stop angle.

Further objects and advantages of the present invention will be apparent from the following description, reference being had to the accompanying drawings wherein a preferred embodiment of the present invention is clearly shown.

Figure 1:
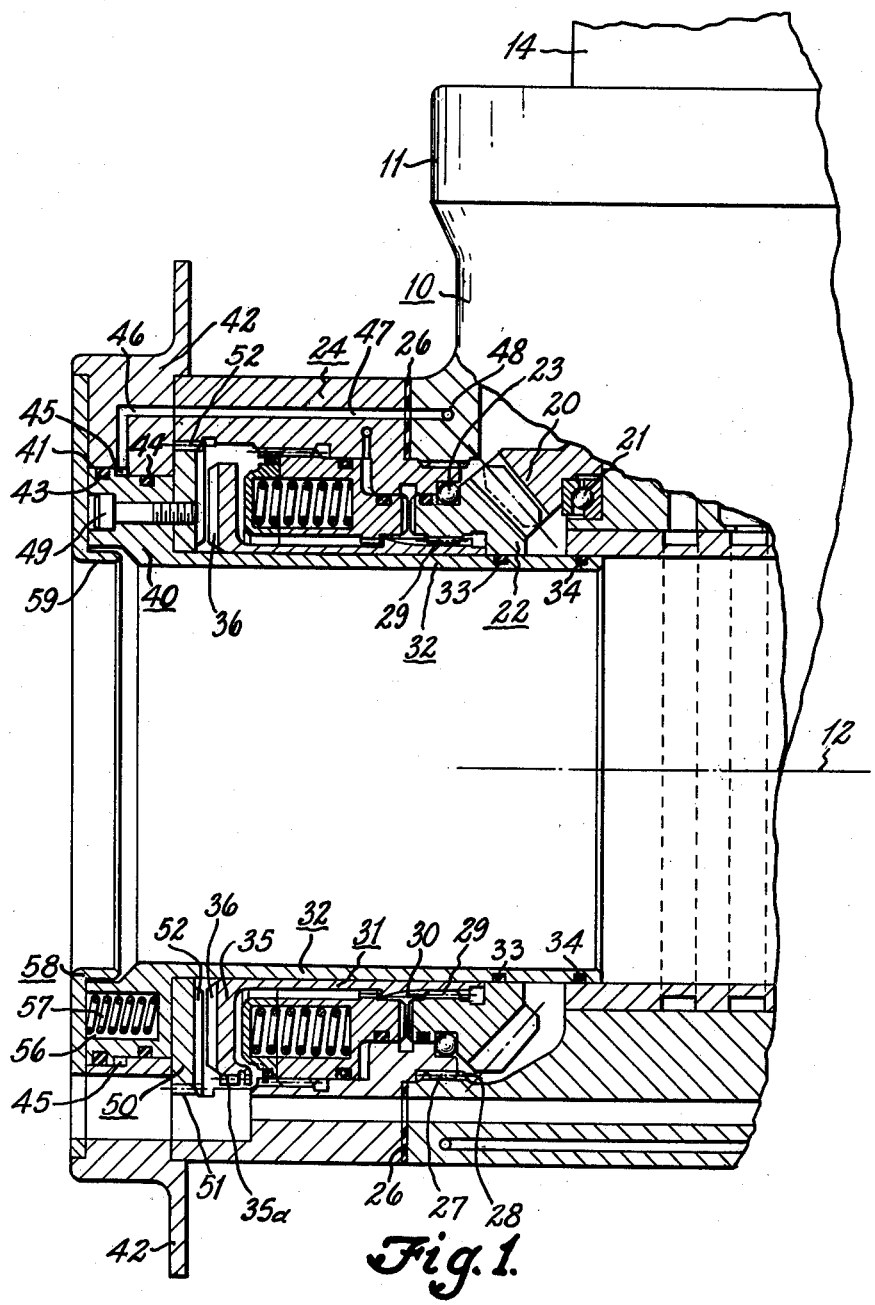
Fig. 1 is a fragmentary view, partly in section and partly in elevation, of a variable pitch propeller constructed according to this invention.
Figure 2:
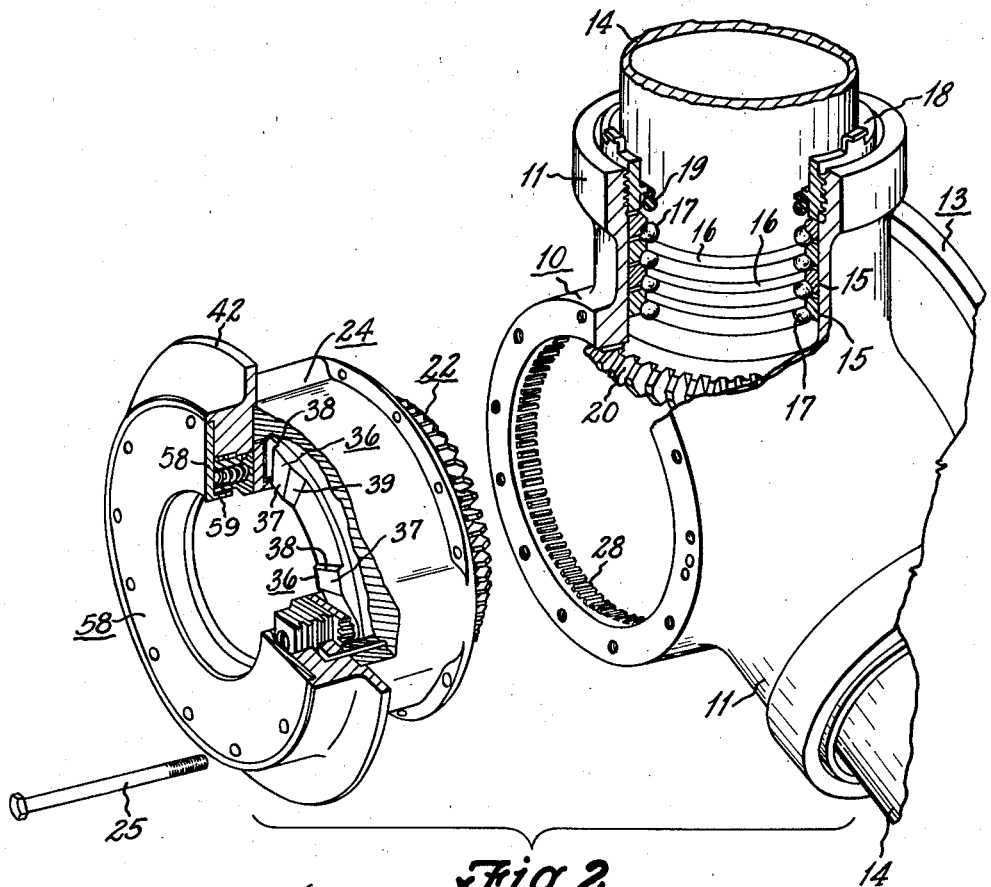
Fig. 2 is an exploded perspective view, partly in section and partly in elevation, of a variable pitch propeller including the mechanical low pitch stop assembly of this invention.

With particular reference to Figs. 1 and 2, this invention is depicted in conjunction with a propeller comprising a hub 10 having a plurality of radially extending sockets 11. The propeller hub 10 is drivingly connected to an engine driven shaft, not shown, the horizontal propeller axis being depicted by the numeral 12 in Fig. 1. A regulator assembly 13 is attached to the rear of the hub 10 and is rotatable therewith, general construction of the propeller being of the type disclosed in the aforementioned Blanchard, et al., patents.

The propeller blades 14 are supported for rotation about their longitudinal axes within the hub socket 11. The blades 14 are journaled in the hub sockets 11 by a combined radial and stack thrust bearing assembly comprising outer races 15, inner races 16 integral with the shank of the blade 14 and a plurality of ball bearings 17. The outer races 15 are retained in assembled relation with the socket 11 and the blade 14 by a retaining nut 18 which has threaded engagement with the socket 11. A suitable grease seal 19 is carried by the retaining nut 18. Each blade 14 is operatively connected to a bevel type blade gear 20, which, as depicted in Fig. 1, is rotatably supported within the hub 10 by a ball bearing assembly 21.

A torque unit assembly, not shown, of the type disclosed in the Martin, et al., Patent 2,500,692 is disposed within the hollow shank portion of each propeller blade 14. The torque units include a piston and cylinder combination, the piston being capable of fluid pressure actuation in both directions and operatively connected to the blade so that piston reciprocation effects rotation of the blade about its longitudinal axis.

In order to synchronize pitch shifting movement of all propeller blades 14 in the hub, the several blade gears 20 mesh with a bevel type master gear 22, as depicted in Fig. 1. The master gear 22 is supported for rotation about the horizontal propeller axis 12 by a ball bearing assembly 23. The ball bearing assembly 23 is supported in part by the master gear 22 and in part by an annular member 24 attached to the front of the hub 10 and forming an extension thereof. The annular member 24 constitutes a housing for a mechanical pitch lock as disclosed in copending application Serial No. 545,033, now abandoned, filed of even date herewith in the name of Oren F. Flaugh, et al. The annular member 24 is attached to the hub 10 by a plurality of bolts, such as indicated by numeral 25, a gasket 26 being interposed between the mating surfaces of the hub 10 and the member 24. The member 24 is restrained against rotation relative to the hub 10, since the member 24 is formed with a set of straight splines 27 which mate with a complementary set of straight splines 28 formed on the hub 10.

Since the propeller blades 14 are drivingly connected with the master gear 22, it is readily apparent that rotation of the propeller blades about their longitudinal axes will effect rotation of the master gear 22 about the horizontal propeller axis 12. Moreover, if the master gear 22 is restrained against rotation in one direction, the propeller blades 14 will, likewise, be restrained against rotation in one direction. Hence, in order to limit movement of the propeller blades in a decrease pitch direction during propeller operation in the governing range, the present invention contemplates mechanical abutment means for preventing rotation of the master gear 22 in a decrease pitch direction when the propeller blades 14 reach a predetermined low angle.

In order to achieve this result, the master gear 22 is formed with an annular extension having a set of straight splines 29, which mate with a complementary set of straight splines 30 formed on a sleeve 31. The sleeve 31 is supported for rotation about the horizontal propeller axis 12 on a second sleeve 32 coaxial with the sleeve 31. The sleeve 32 is piloted in the hub 10 and carries sealing rings 33 and 34, which engage the master gear 22 and the hub 10, respectively.

The sleeve 31 is formed with a radially outward extending flange 35 having a partially toothed periphery 35a which constitutes a feedback gear. The feedback gear and the mechanism associated therewith may be of the type disclosed in copending application Serial No. 289,110, filed May 21, 1952, in the name of Richard A. Hirsch and assigned to the assignee of this invention. The flange 35 also has formed thereon five axially extending jaws 36. As seen diagrammatically in Fig. 3 and structurally in Fig. 2, the jaws 36 are formed with flat surfaces 37 lying in a plane substantially parallel to the plane of the flange 35, and perpendicular to the horizontal propeller axis, one end of the flat surface 37 terminating in an abrupt shoulder 38, and the other end being formed as a ramp 39. The abrupt shoulders 38 are substantially normal to the plane of the flange 35, whereas the inclined cam, or ramp surface, 39 define an acute angle with respect to the plane of the flange 35.

The sleeve 32 is, likewise, formed with a radially outward extending flange 40 having a stepped outer periphery so as to form a shoulder 41. The outer periphery of the flange 40 is received by the inner periphery of a ring 42 which is attached to the annular member 24 and the hub 10 by the bolts 25. The stepped outer periphery of the flange 40 carries sealing rings 43 and 44 which engage the inner stepped periphery of the ring 42. The flange 40 and the ring 42 define therebetween a servo chamber 45, which is connected by mating passages 46 and 47 in the ring 42 and member 24, respectively, to a hub passage 48.

The flange 40 has attached thereto by a plurality of bolts 49, an annulus 50 located in juxtaposed relation to the flange 35 of the sleeve 31. The annulus 50 is formed with an exterior set of straight splines 51, which mate with a set of straight splines 52 on the member 24 whereby the annulus 50 is restrained against rotation relative to the member 24 and the hub 10. The annulus 50 also has formed thereon five circumferentially spaced, axially extending jaws 52 of identical construction with the jaws 36 on the flange 35. Thus, as depicted in Fig. 3, the jaws 52 have flat surfaces 53 disposed in a plane parallel to the plane of the annulus 50, abrupt shoulders 54 located at right angles to the annulus 50 and inclined ramps 55 defining an acuate angle with respect to the annulus 50.

The flange 40 of the sleeve 32 is also formed with a plurality of circumferentially spaced circular spring cavities 56 within which coil type compression springs 57 are disposed. The open ends of the cavities 56 are closed by a ring member 58 having an inturned flange 59, the ring 58 being secured to the ring 42, the member 24 and the hub 10 by the bolts 25.

The sleeve 32 is movable axially relative to the hub 10, which movement is effected by applying pressure fluid to the servo chamber 45. The shoulder 41 on the flange 40 constitutes a piston surface upon which the pressure fluid in servo chamber 45 acts so as to move the sleeve 32 axially to the position depicted in Fig. 1. When the sleeve 32 is in the axial position depicted in Fig. 1, the mechanical low pitch stop comprising jaws 36 and 52, is disengaged. That is, the jaws 36 on the sleeve 31 will not engage the jaws 52 on the annulus 50 irrespective of the pitch position of the propeller blades 14. However, when the servo chamber 45 is connected to drain, the springs 57 will move the sleeve 32 axially to the right, as viewed in Fig. 1, and thereby move the jaws 52 on the annulus 50 into an operative position with respect to the jaws 36 on the sleeve 31.

Figure 3:
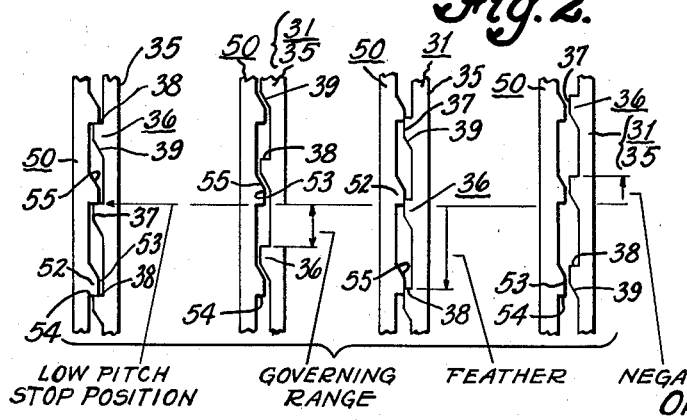
Fig. 3 is a composite schematic view depicting the relationship between the coacting stop members at different pitch positions of the propeller blades.

With particular reference to Fig. 3, the mode of operation of the releasable mechanical low pitch stop of this invention will be described in greater detail. When the propeller blades 14 move in a decrease pitch direction, the master gear 22 and the sleeve 31, Fig. 1, which is integral with jaws 36, rotate in a counterclockwise direction, as view in Fig. 2, or upwardly, as viewed in Fig. 3. Conversely, when the propeller blades 14 move in an increase pitch direction, the master gear 22 and the jaws 36 on the sleeve rotate in a clockwise direction, as viewed in Fig. 2, or downwardly, as viewed in Fig. 3. When the servo chamber 45 is connected to drain, the annulus 50 is moved into an operative position, as depicted in the diagrams labeled "Low Pitch Stop Position" and "Governing Range" of Fig. 3. Accordingly, when the propeller blades reach a predetermined low angle, the shoulders 38 of the jaws 36 will abut the shoulders 54 of the jaws 52 so as to prevent further movement of the blades in a decrease pitch direction.

When the propeller blades 14 are moved to the feathered position, the sleeve 31 moves downwardly, as viewed in Fig. 3, from the position depicted in the diagram entitled "Governing Range" to the position depicted in the diagram entitled "Feather." In moving to this position, the ring 50 is moved axially to the left, as viewed in Figs. 1 and 3, by reason of the inclined cam surfaces 39 and 55 of the jaws 36 and 52, respectively. In other words, as the sleeve 31 moves towards the feathered position, the jaws 36 ride up the inclined cam surfaces 55 of the annulus 50 and at the feathered position the flat surfaces 37 and 53 of the jaws 36 and 52, respectively, are in engagement.

When the servo chamber 45 is pressurized, the ring 50, as alluded to hereinbefore, is moved axially to the left to the position depicted in Fig. 1. With the annulus 50 in this position, the coacting jaws on the sleeve 31 and the annulus 50 are maintained out of engagement and, hence, the sleeve 31 can be moved in a counterclockwise direction, as viewed in Fig. 2, or upwardly as viewed in Fig. 3, to the position indicated by the diagram entitled "Negative" in Fig. 3. Thus, the propeller blades 14 may be moved in a decrease pitch direction to an angle substantially below the mechanical low pitch stop angle of the governing range.

Figure 4:
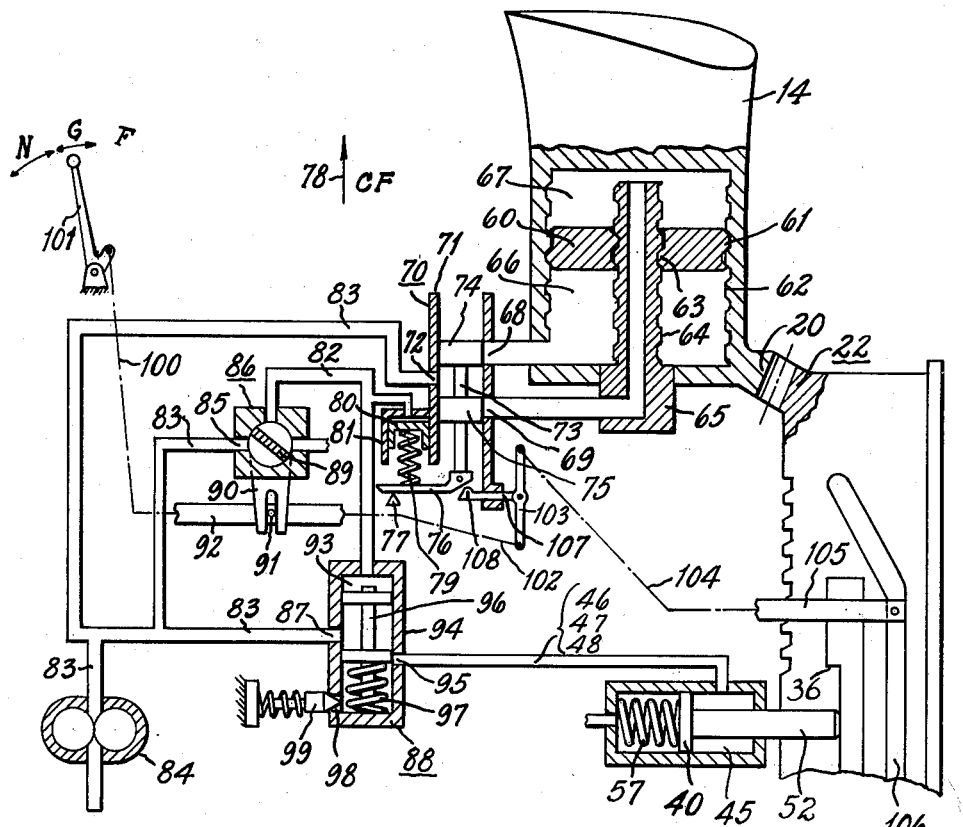
Fig. 4 is a schematic diagram of a simplified fluid pressure system for controlling a variable pitch propeller having the mechanical low pitch stop of the present invention.

With particular reference to Fig. 4, a simplified hydraulic system for controlling the propeller having the pitch lock mechanism of this invention will be described. The propeller blade 14 is shown including a schematic torque unit of the type described in the aforementioned Martin, et al., patent. The torque unit comprises a reciprocable piston 60 having external helical splines 61, which engage internal helical splines 62 shown integral with the blade 14. The piston 60 also includes internal helical splines 63, which engage helical splines 64 formed on a fixed reaction member 65. The piston 60 divides its cylinder into an increase pitch chamber 66 and a decrease pitch chamber 67. The increase pitch chamber 66 is shown connected to a port 68 of a control valve 70, while the decrease pitch chamber 67 is connected to a port 69 thereof. Structurally, the governor valve 70 may be of the type disclosed in copending application, Serial No. 485,922, filed February 3, 1955, in the name of Brandes, et al., and assigned to the assignee of this invention. Schematically, the governor valve 70 is shown including a valve guide 71 having a pressure supply port 72 and the control ports 68 and 69, in combination with a reciprocable plunger 73 having spaced lands 74 and 75. The plunger 73 is pivotally connected at its inner end to a lever 76 having a fixed fulcrum point 77. The lever 76 and the plunger 73 are disposed in the regulator 13 and respond to the thrust of centrifugal force in the direction of arrow 78. Upward movement of the plunger 73 in response to centrifugal force is opposed by a spring 79, one end of which engages the lever 76 and the other end of which engages a servo piston 80. The servo piston is disposed within a servo cylinder 81, which is connected to a conduit 82.

The pressure port 72 of the governor valve 70 is connected to a conduit 83, which communicates with the output of a pump 84. The conduit 83 also communicates with the inlet port 85 of a selector valve 86, and the inlet port 87 of a pitch stop control valve 88.

The rotary selector valve 86 includes a rotatable plug 89, which is operatively connected to a lever 90 having a bifurcated end engaging a pin 91 on a rod 92. The rotary selector valve 86 controls the application of pressure fluid from the source, or pump, 84, to the conduit 82, which connects with the servo chamber 81 and a servo chamber 93 of the pitch lock control valve 88.

The pitch stop control valve 88 includes a casing 94 having an outlet port 95, which is connected to the passages 46, 47 and 48. A two-landed plunger 96 is disposed within the valve casing 94, the plunger being urged upwardly by a coil spring 97, as well as the thrust of centrifugal force. The casing 94 also includes a drain port 98, which is normally closed by a spring-biased check valve 99.

The rod 92 is shown connected by a mechanical linkage 100 to a propeller control lever 101 having a negative range of operation denoted by the letter N, a governing range denoted by the letter G, and a feathering position denoted by the letter F. The rod 92 is also connected by a mechanical linkage denoted by the numeral 102 to one end of a lever 103. The other end of the lever 103 is connected by a mechanical linkage 104 to the feedback mechanism depicted as comprising a rod 105, which follows a cam track 106 in the master gear 22. The intermediate point of the lever 103 positions a carriage 107, which carries a cam 108 arranged to cooperate with the lever 76.

The propeller blade 14 is shown having its blade gear 20 meshing with the master gear 22. The mechanical low pitch stop is diagrammatically shown as comprising a jaw 36 formed on the master gear 22, which cooperates with the jaw 52 of the flange 40 which has a piston surface. The passages 46, 47 and 48 communicate with the servo chamber 45, and the jaw 52 is normally maintained in operative position by spring 57.

When the propeller control lever 101 is in the governing range, the servo chamber 93 of the pitch lock control valve 88 is connected to drain. Accordingly, the spring 97 and the thrust of centrifugal force 78 will move the plunger 96 upwardly to connect passages 46, 47 and 48 with the port 98 through port 95. The spring-biased check valve 99 assures that a minimum pressure, for instance, 20 p.s.i., will be maintained in the servo chamber 45 at all times. In this way, the quantity of fluid required to release the pitch lock will be maintained at a minimum. In the governing range, as alluded to hereinbefore, the pitch lock is operative to prevent movement of the blades 14 below a predetermined low blade angle.

When the propeller control lever 101 is moved into the negative thrust range, the rod 92 is moved to the right, as viewed in Fig. 4, whereby the rotary selector valve 86 will interconnect conduits 83 and 82. When conduit 82 receives pressure fluid, the load on the spring 79 is increased so that the lever 76 is maintained in engagement with the cam 108. At the same time, the servo chamber 93 is pressurized and plunger 96 moves downwardly to interconnect conduit 83 and passages 46, 47 and 48. Thus, the low pitch stop is released and the valve plunger 73 can be positioned through the lever mechanism 103 which moves cam 108 so as to apply pressure fluid to the decrease pitch chamber and move the blades 14 to an angle below the minimum low pitch stop angle in the governing range.

When the propeller control lever 101 is moved to the feather position, the rod 92 is moved to the left, as viewed in Fig. 4, and through the lever mechanism 103 biases the plunger 73 upwardly. The low pitch stop mechanism is not released since the coacting inclined cam surfaces on the pitch stop jaws permit movement of the blades to the feathered position. Thus, fluid under pressure is merely supplied to the increase pitch chamber 66, while the decrease pitch chamber 67 is connected to drain.

While the embodiment of the present invention as herein disclosed, constitutes a preferred form, it is to be understood that other forms might be adopted.

What is claimed is as follows:

1. A variable pitch propeller including, a hub, a plurality of propeller blades journaled in said hub for rotation about their longitudinal axes to different pitch positions, means supported for rotation in said hub about the horizontal propeller axis and operatively connected to said blades so as to be rotated thereby upon rotation of said blades about their longitudinal axes, means carried by said hub and operatively connected to said blades for rotating said blades about their longitudinal axes, and stop means restrained against rotation relative to said hub, said stop means including an axially movable annular member engageable with said first recited means at only one predetermined pitch position of said propeller blades for preventing further rotation of said propeller blades in a decrease pitch direction in one range of propeller operation.

2. A variable pitch propeller including, a hub, a plurality of propeller blades journaled in said hub for rotation about their longitudinal axes to different pitch positions, means supported for rotation in said hub about the horizontal propeller axis and operatively connected to said blades so as to be rotated thereby upon rotation of said blades about their longitudinal axes, means carried by said hub and operatively connected to said blades for rotating said blades about their longitudinal axes, stop means restrained against rotation relative to said hub, said stop means including an axially movable annular member engageable with said first recited means at only one predetermined pitch position of said propeller blades for preventing further rotation of said propeller blades in a decrease pitch direction, and manually controlled means for extending and retracting said stop means.

3. A variable pitch propeller including, a hub, a plurality of propeller blades journaled in said hub for rotation about their longitudinal axes to different pitch positions, means supported for rotation in said hub about the horizontal propeller axis and operatively connected to said blades so as to be rotated thereby upon rotation of said blades about their longitudinal axes, means carried by said hub and operatively connected to said blades for rotating said blades about their longitudinal axes, stop means restrained against rotation relative to said hub, said stop means including an axially movable annular member engageable with said first recited means at only one predetermined pitch position of said propeller blades for preventing further rotation of said propeller blades in a decrease pitch direction, a single acting servo for extending and retracting said stop means, and manual means for controlling the operation of said servo.

4. In a variable pitch propeller including, a hub, a plurality of propeller blades journaled in said hub for rotation about their longitudinal axes to different pitch positions, means carried by said hub and operatively connected to said blades for changing the pitch position thereof, a gear supported for rotation in said hub about the horizontal propeller axis and operatively connected to said blades so as to be rotated thereby upon pitch changing movement of said blades, stop means restrained against rotation relative to said hub and operatively engageable with said gear at only one predetermined pitch position of said blades for preventing further movement of said blades in a decrease pitch direction during propeller operation in one range, and means including cooperating cam members engageable during propeller operation in another range for positively retracting said stop means.

5. In a variable pitch propeller including, a hub, a plurality of propeller blades journaled in said hub for rotation about their longitudinal axes to different pitch positions, means carried by said hub and operatively connected to said blades for changing the pitch position thereof, a gear supported for rotation in said hub about the horizontal propeller axis and operatively connected to said blades so as to be rotated thereby upon pitch changing movement of said blades, means for preventing movement of said propeller blades below only one predetermined pitch position in one range of propeller operation including a first member having a plurality of circumferentially spaced, axially extending lugs connected to rotate with said gear and a second member having a plurality of circumferentially spaced, axially extending lugs restrained against rotation relative to said hub but movable axially relative thereto, the lugs of said second member being engageable with the lugs of said first member only at said one predetermined pitch position, and manually controlled means for extending and retracting said second member into and out of operative relationship with said first member.

6. In a variable pitch propeller including, a hub, a plurality of propeller blades journaled in said hub for rotation about their longitudinal axes to different pitch positions, means carried by said hub and operatively connected to said blades for changing the pitch position thereof, a gear supported for rotation in said hub about the horizontal propeller axis and operatively connected to said blades so as to be rotated thereby upon pitch changing movement of said blades, means for preventing movement of said blades below only one predetermined pitch position in a predetermined range of propeller operation including a first annular member connected to rotate with said gear, and a second annular member restrained against rotation relative to said hub but movable axially relative thereto, said second annular member being engageable with said first annular member only at said one predetermined pitch position, a single-acting servo connected to said second member for effecting axial movement thereof to and out of operative relationship with said first member, and manual means for controlling said servo.

7. In a variable pitch propeller including, a hub, a plurality of propeller blades journaled in said hub for rotation about their longitudinal axes to different pitch positions, means carried by said hub and operatively connected to said blades for changing the pitch position thereof, a gear supported for rotation in said hub about the horizontal propeller axis and operatively connected to said blades so as to be rotated thereby upon pitch changing movement of said blades, means for preventing movement of said blades below only one predetermined pitch position in one range of propeller operation, said last recited means including a first member connected to rotate with said gear and a second member restrained against rotation relative to said hub but movable axially relative thereto, said second member being engageable with said first member only at said one predetermined pitch position, a piston operatively connected to said second member for moving said second member axially out of operative relationship with said first member, resilient means engaging one side of said piston and urging said second member into operative relationship with said first member, a source of fluid under pressure, and means for admitting fluid under pressure to the other side of said piston to maintain said members out of operative relationship.

8. In a variable pitch propeller including, a hub, a plurality of propeller blades journalled in said hub for rotation about their longitudinal axes to different pitch positions, means carried by said hub and operatively connected to said blades for changing the pitch position thereof, a gear supported for rotation in said hub about the horizontal propeller axis and operatively connected to said blades so as to be rotated thereby upon pitch changing movement of said blades, means for preventing movement of said blades below only one predetermined pitch position in one range of propeller operation, said last recited means including a first member connected to rotate with said gear and a second member restrained against rotation relative to said hub but movable axially relative thereto, said first member comprising a sleeve having a straight spline connection with said gear and an up-turned flange having a plurality of circumferentially spaced jaws thereon, said second member comprising a ring having a straight spline connection with said hub and a complementary set of circumferentially spaced jaws located in juxtaposition to the jaws of said first member, a piston operatively connected to said second member for moving said second member axially out of operative relationship with said first member, said piston comprising a sleeve coaxial with said first member and arranged for axial movement relative thereto, resilient means engaging one side of said piston and urging said second member into operative relationship with said first member, a source of fluid under pressure, and means for admitting fluid under pressure to the other side of said piston to maintain said members out of operative relationship.

9. The combination set forth in claim 8 wherein the jaws of said first and second members have abrupt engageable shoulders at one end and cooperating cam surfaces at the other end.

10. A mechanical low pitch stop for a variable pitch propeller having a hub, a plurality of propeller blades mounted for pitch changing movement in said hub, and means carried by said hub and operatively connected to said blades for changing the pitch of said blades and for coordinating the pitch changing movement thereof including a master gear rotatably journaled in said hub, including in combination, a first annular member connected to rotate with said gear and having a predetermined angular position relative to said hub for each pitch position of said propeller blades, a second annular member restrained against rotation relative to said hub but movable axially relative thereto, and manually controlled means for moving said second member into operative relationship with said first member, said first member being engageable with said second member to preclude further rotation of said first member in the decrease pitch direction at only one predetermined pitch position of said blades to prevent further pitch changing movement of said blades in a decrease pitch direction.

11. A mechanical low pitch stop for a variable pitch propeller having a hub, a plurality of propeller blades mounted for pitch changing movement in said hub, and means carried by said hub and operatively connected to said blades for changing the pitch of said blades and for coordinating the pitch changing movement thereof including a master gear rotatably journaled in said hub, including in combination, a first sleeve coaxial with said hub and having a straight spline connection with said gear, said first sleeve having an upturned flange with a plurality of circumferentially spaced jaws thereon, a ring having a straight spline connection with said hub and a plurality of circumferentially spaced jaws thereon, a second sleeve coaxial with said hub and movable axially relative thereto, means interconnecting said second sleeve and said ring, and manually controlled means for effecting axial movement of said second sleeve and said ring into and out of operative relationship with said first sleeve.

12. A mechanical low pitch stop for a variable pitch propeller having a hub, a plurality of propeller blades mounted for pitch changing movement in said hub, and means carried by said hub and operatively connected to said blades for changing the pitch of said blades and for coordinating the pitch changing movement thereof including a master gear rotatably journaled in said hub, including in combination, a first sleeve coaxial with said hub and having a straight spline connection with said gear, said first sleeve having an upturned flange with a plurality of circumferentially spaced jaws thereon, a ring having a straight spline connection with said hub and a plurality of circumferentially spaced jaws cooperable with the jaws of said first sleeve, a second sleeve coaxial with said hub and movable axially relative thereto, means interconnecting said second sleeve and said ring, resilient means acting upon said second sleeve for urging said ring into operative relationship with said first sleeve, and manually controlled means for moving said second sleeve in opposition to said resilient means to maintain said ring out of operative relationship with said first sleeve.

13. In a propeller having a hub, a plurality of blades mounted for pitch changing movement in said hub, means for varying the pitch of said blades including a source of fluid under pressure, said propeller being operable in a negative thrust range, a governing range and a feathering range, a gear operatively connected to said blades for coordinating the pitch changing movement thereof, a low pitch stop comprising engageable stop members operatively connected to said hub and to said gear and engageable at only one predetermined pitch position of said blades for preventing movement of said blades below said one predetermined low pitch position in the governing range, said stop members having abrupt shoulders engageable at a predetermined low pitch position of said blades and cooperating cam means engageable in the feathering range for positively retracting one of said stop members, a piston connected to said one member, resilient means engaging one side of said piston for urging said one member into operative relationship with the other member, and a manually controlled valve for directing fluid under pressure to the other side of said piston to retract said one member during propeller operation in the negative thrust range.

References Cited in the file of this patent
UNITED STATES PATENTS

| | | |
|---|---|---|
| 2,487,239 | Hardy | Nov. 8, 1949 |
| 2,609,057 | Crowhurst | Sept. 2, 1952 |
| 2,703,148 | Pearl | Mar. 1, 1955 |
| 2,856,012 | Frankland | Oct. 14, 1958 |